(12) United States Patent
Mimura et al.

(10) Patent No.: US 7,551,244 B2
(45) Date of Patent: Jun. 23, 2009

(54) OPTICAL ELEMENT, LIGHT SOURCE UNIT, AND DISPLAY DEVICE

(75) Inventors: Kouji Mimura, Tokyo (JP); Ken Sumiyoshi, Tokyo (JP); Fujio Okumura, Tokyo (JP); Shigetoshi Hayata, Fukuoka (JP); Tamio Uchino, Fukuoka (JP); Yoshiaki Furuya, Fukuoka (JP); Youhei Saitou, Fukuoka (JP); Katsuhisa Ishii, Fukuoka (JP); Takahiko Kanamori, Fukuoka (JP)

(73) Assignees: NEC Corporation, Tokyo (JP); NEC LCD Technologies, Ltd., Kanagawa (JP); SEIKO Company, Ltd., Fukuoka (JP)

( * ) Notice: Subject to any disclaimer, the term of this patent is extended or adjusted under 35 U.S.C. 154(b) by 263 days.

(21) Appl. No.: 11/510,001

(22) Filed: Aug. 25, 2006

(65) Prior Publication Data
US 2007/0097290 A1 May 3, 2007

(30) Foreign Application Priority Data
Aug. 25, 2005 (JP) .............................. 2005-244159

(51) Int. Cl.
*G02F 1/1335* (2006.01)
*G02F 1/133* (2006.01)
*G02F 1/1337* (2006.01)
*G02F 1/1343* (2006.01)
*G02F 1/1345* (2006.01)
*G02F 1/1333* (2006.01)

(52) U.S. Cl. .............................. 349/69; 349/21; 349/61; 349/128; 349/129; 349/139; 349/142; 349/143; 349/151; 349/158

(58) Field of Classification Search .................. 349/21, 349/61, 128, 129, 139, 142, 143, 151, 158
See application file for complete search history.

(56) References Cited

U.S. PATENT DOCUMENTS

| 2002/0067457 A1* | 6/2002 | Mase ........................... 349/155 |
| 2004/0246428 A1* | 12/2004 | Shirato ........................ 349/152 |
| 2006/0158589 A1* | 7/2006 | Nishi et al. .................. 349/117 |
| 2006/0187380 A1* | 8/2006 | Tsuda et al. .................. 349/96 |

FOREIGN PATENT DOCUMENTS

| JP | 9-197405 | 7/1997 |
| JP | 10-173304 | 6/1998 |
| JP | 2000-111936 | 4/2000 |
| JP | 2001-242799 | 9/2001 |
| JP | 2001-356360 | 12/2001 |
| JP | 2003-270656 | 9/2003 |

* cited by examiner

*Primary Examiner*—Charlie Peng
*Assistant Examiner*—Hung Lam
(74) *Attorney, Agent, or Firm*—Scully, Scott, Murphy & Presser, P.C.

(57) ABSTRACT

An optical element comprises a pair of substrates each having an electrode and bonded together with a gap therebetween and a light adjusting material including a liquid crystal and enclosed in the gap. Each of the pair of substrates has an electrode connecting portion to be connected to an external circuit. At least a part of the electrode connecting portion of each of the substrates is located on the same side as that of the optical element. The electrode connecting portion of one of the substrates and the electrode connecting portion of the other of the substrates have respective electrode portions at regions that are not opposed to each other. The electrode portion of each of the electrode connecting portions is connected to the external circuit.

10 Claims, 8 Drawing Sheets

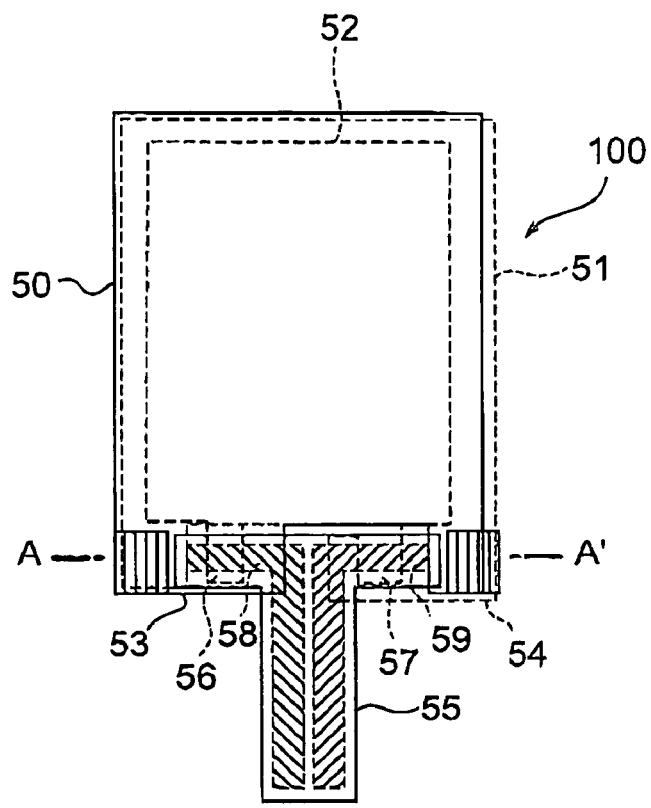
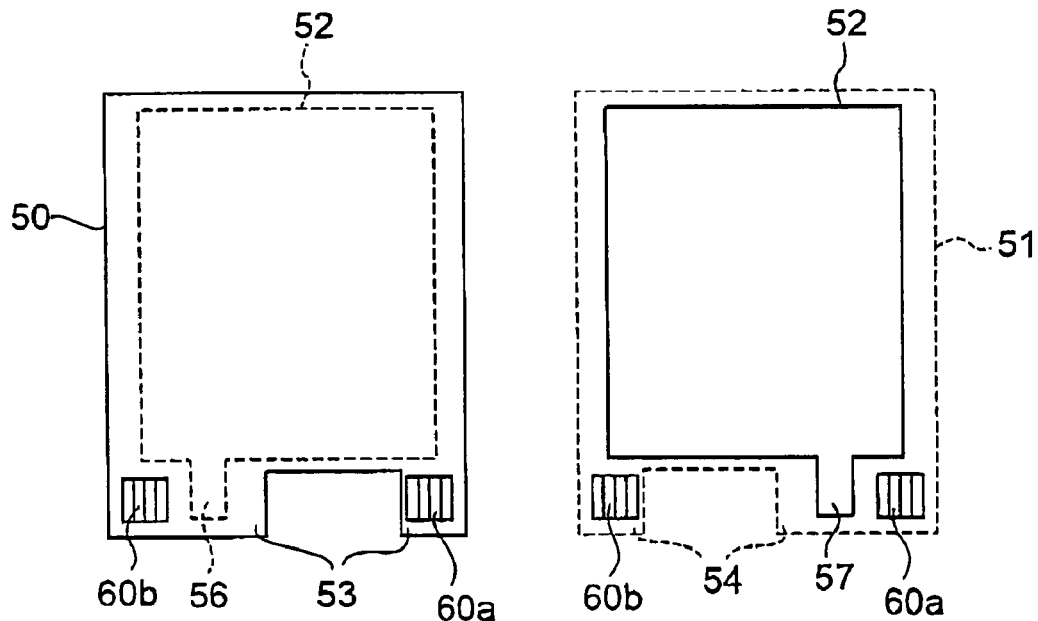
FIG. 6A
FIG. 6B  FIG. 6C

OPTICAL ELEMENT, LIGHT SOURCE UNIT, AND DISPLAY DEVICE

This invention claims priority to prior application JP 2005-244159, the disclosure of which is incorporated herein by reference.

BACKGROUND OF THE INVENTION

The present invention relates to an optical element, light source unit, and display device. More specifically, the present invention concerns an optical element with a terminal connecting structure, having an improved yield while ensuring reliability, a light source unit using this optical element, and a display device equipped with this light source unit.

Liquid crystal display devices are installed on portable or hand-held terminals (mobile phones, notebook personal computers, etc.) and others, and they are in widespread use because of their features of being thin, lightweight, and low in power consumption. Such features of the liquid crystal display devices allow hand-held terminals to be used under various environments.

For example, in some case, the display of a hand-held terminal may be shared among a plurality of persons in a conference, and in some case, information may be inputted into the hand-held terminal at a public place such as an electric train or airplane.

In this way, performance required of the display of handheld terminal varies depending on usage environments. For example, in the former case, since the display is shared among a plurality of persons, it is desired that the display of handheld terminal be visible from anywhere, i.e., the view angle of the display device be as wide as possible. On the other hand, in the latter case, from the viewpoint of information conservation and privacy protection, it is desired that the view angle be no wider than allows user alone to see the display.

Therefore, it is demanded that the display of hand-held terminal, especially the view angle can be controlled to vary from a wide view angle state up to a narrow view angle state in accordance with a usage environment. A display device meeting this demand is, for example, disclosed in Japanese Unexamined Patent Application Publication No. 9-197405 (hereinafter referred to as Patent Document 1).

FIGS. 1A and 1B each schematically illustrates a conventional liquid crystal display device set forth in the Patent Document 1, wherein FIGS. 1A and 1B show a wide view angle state and narrow view angle state, respectively.

As shown in FIGS. 1A and 1B, the conventional liquid crystal display device 200 includes a liquid crystal display element 40, light source 41, first optical element 42 that substantially collimates light from the light source 41, and second optical element 43 that electrically controls diffusion/rectilinear-propagation of light emitted from the first optical element 42. The liquid crystal display device 200 is configured so that the light source 41, first optical element 42, second optical element 43, and liquid crystal display element 40 are stacked in this order from the light source side.

The liquid crystal display device 200 performs switching between a wide view angle display and narrow view angle display, by controlling rectilinear-propagation/diffusion of light entering the liquid crystal display element 40 by the second optical element 43.

In the liquid crystal display device 200 performing switching between a wide view angle display and narrow view angle display in this way, at least the optical element 43 must be inserted between the liquid crystal display element 40 and light source 41.

However, in a mobile phone, since a light source and optical element are accommodated in a very compact manner, a space for incorporating therein the optical element 43 is highly limited. In particular, because the casing trim-like frame (hereinafter referred to as a frame) of the display portion is very narrow, a terminal connecting portion between the optical element 43 and an external circuit for driving the optical element 43 has a significantly limited space.

In order to insert at least the optical element 43 between the liquid crystal display element 40 and light source 41, it is desirable that the optical element 43 be thin and lightweight. A possible method for reducing the thickness and weight of the optical element 43 is to use a film as a substrate. In this case, as in the case of a conventional liquid crystal panel, if a pair of substrates are opposed, an electrode of one of the substrates is electrically connected to an electrode of the other of the substrates via a silver paste, and the one substrate alone is electrically connected with an external circuit, then the gap in the silver paste portion increases. This undesirably causes variations in displays of the optical element 43. Therefore, when thinned substrates are to be used, it is desirable not to electrically connect the one substrate alone, but connect both of the pair of the substrates to the external circuit.

Methods for taking out respective electrodes from both of the pair of the substrates and connecting them to the external circuit, are disclosed in Japanese Unexamined Patent Application Publication No. 2001-356360 (hereinafter, Patent Document 2) and Japanese Unexamined Patent Application Publication No. 10-173304 (hereinafter, Patent Document 3).

The Patent Document 2 sets forth a structure for the connection of a liquid crystal device with an external circuit.

FIG. 2 is a plan view showing a connection structure between a liquid crystal device and external circuit, the connection structure being disclosed in the Patent Document 2. A liquid crystal panel 1 comprises a first substrate 2, second substrate 3, and cell constituted of a sealing member (not shown) interposed between the first and second substrates 2 and 3, the cell being formed by sealing therein a liquid crystal (not shown). The first substrate 2 has a first connection portion 2a formed so as to project from a portion opposed to the second substrate 3. On the surface of the first connection portion 2a, an electrode pattern (not shown) is formed and a first integrated circuit 5 is mounted. The second substrate 3 has a second connection portion 3a formed so as to project from a portion opposed to the first substrate 2. On the surface of the second connection portion 3a, there is provided an electrode pattern (not shown).

A flexible substrate 4 includes a first end portion 4a and second end portion 4d. On the first end portion 4a, an electrode pattern and connector portion (neither shown) are formed, and a second integrated circuit 6 is mounted. An electrode pattern (not shown) is also formed on the second end portion 4d.

An electrode pattern (not shown) of the flexible substrate 4 is connected to the first substrate 2, and an electrode pattern (not shown) of the flexible substrate 4 is also connected to the second substrate 3. The flexible substrate 4 is substantially orthogonally folded at a folded portion located at the midway between the first end portion 4a and second end portion 4d.

On the other hand, the Patent Document 3 discloses a structure for the connection of a liquid crystal device with a circuit substrate.

FIG. 3 is a schematic sectional view showing a connection method for an LCD (liquid crystal display) panel substrate and circuit substrate (FFC) [flat flexible cable], the connection method being disclosed in the Patent Document 3. An LCD panel substrate 32 comprises an upper substrate (first substrate) 21 and lower substrate (second substrate) 22, and liquid crystal (not shown) interposed therebetween, and seal portion 23 arranged therearound. A transparent electrode 24 and terminal 28 are formed on the surface of the upper substrate 21, and a conductive paste 30 is formed on the surface of the terminal 28. Similarly, a transparent electrode 25 and terminal 29 are formed on the surface of the lower substrate 22, and a conductive paste 31 is formed on the surface of the terminal 29.

Here, the side of the upper substrate 21, to be connected to the FFC is referred to as an upper tail portion 26, while the side of the lower substrate 22, to be connected to the FFC is referred to as a lower tail portion 27.

For the connection between the LCD panel substrate and FFC, firstly the upper substrate 21 and lower substrate 22 are pinched and fixed by a pinching member 20 using seal portion 23 on the sides of the upper tail portion 26 and lower tail portion 27. Then, a jig 15 having therein an opening 16 is inserted between the upper and lower tail portions 26 and 27; the space between the upper tail portion 26 and lower tail portion 27 is opened up; and a connecting terminal 13 of the FFC 10 is inserted into the opening 16. The connecting terminal 13 is covered with a covering material 12. By heating and fusing conductive pastes 30 and 31 that have been coated and hardened on the terminals 28 and 29, respectively, the terminal 28 of the upper tail portion 26, the terminal 29 of the lower tail portion 27, and the connecting portion 13 of the FFC 10 can be connected. Then, the LCD panel 32 and FFC 10 are bonded together with an adhesive tape. Thereafter, the pinching member 20 is removed and the jig 15 is removed through the opening 16 of the FFC 10.

However, the above-described conventional arts involve the following problems.

In the liquid crystal device set forth in the Patent Document 2, the taking out of electrodes in the first and second substrates is performed from two sides of the liquid crystal device. However, this undesirably widens the frame of the sides for taking out the electrode. In particular, when the liquid crystal device is incorporated into a mobile phone, a light source or optical element is accommodated in a very compact manner. As a result, the space for accommodating the optical element 43 is so small that the connection with the outside is performed by substantially one side. If the structure of the device is left unchanged, the connection with an external circuit for driving the optical element 43 would be impossible.

In the liquid crystal display device set forth in the Patent Document 3, it is attempted to establish the connection with the external circuit by opening a part of the device. However, in the case where the connecting portion with the external circuit is very narrow as in the mobile phone, there is no space for create a margin for opening. As a result, when terminals are joined to each other, there occurs seal peeling in the vicinity of the opening portion, resulting in a reduction in yield. Also, since the terminal is sandwiched between the upper tail portion and lower tail portion, the gap in the vicinity of the terminal connection portion increases by the thickness of the terminal. Hence, it is difficult to control the gap in the display surface, resulting in occurrences of variations in display. Furthermore, because of the structure such that the terminal is sandwiched between the upper and lower substrates, electrode portions near the seal material must be exposed. As a consequence, there occurs a possibility that a short circuit between electrodes will takes place and that the electrodes will become corroded because of adhesion of water or the like.

SUMMARY OF THE INVENTION

Accordingly, it is an object of the present invention to provide an optical element allowing the above-described problems to be solved.

To solve the above-described object, we have carried out researches and obtained the conclusions described hereinafter.

According to a first aspect of the present invention an optical element is provided. In the optical element, a pair of substrates each having an electrode is bonded together with a gap therebetween, and a light adjusting material including a liquid crystal is enclosed in the gap. Each of the pair of substrates has an electrode connecting portion to be connected to an external circuit. At least a part of the electrode connecting portion of each of the substrates is located on the same side as that of the optical element. The electrode connecting portion of one of the substrates and the electrode connecting portion of the other of the substrates have respective electrode portions at regions that are not opposed to each other. The electrode portion of each of the electrode connecting portions is connected to the external circuit.

Since the optical element according to the first aspect is configured so that the electrode connecting portion on one substrate and that on the other substrate do not superimpose on each other, the terminal can be connected without the need to open the terminal connecting portions, unlike the case of the Patent Document 2. This allows the suppression of yield reduction of the optical element due to seal peeling when performing terminal connection. Furthermore, since the terminal connection can be established without the need to open terminal connecting portions, it is possible to reduce a margin on the seal side of the opening portion for terminal connection, leading to the narrowing of the frame of sides of the terminal connecting portions. Furthermore, since the terminal connection is feasible without the use of a pinching member or a jig for terminal insertion unlike the conventional art, work efficiency is improved. Moreover, since the electrode connecting portion of one substrate and that of the other substrate are not superimposed on each other, there is no need for the connection terminal to be pinched by a pair of substrates, thereby eliminating a gap defect of the optical element due to the thickness of the connection terminal.

As is evident from the foregoing, the optical element according to the first aspect allows its yield to be improved while ensuring its reliability, and further can be held in a space-saving manner.

An optical element according to a second aspect is characterized in that an electrode portion does not project from a side of the optical element. That is, in the optical element according to the second aspect, a side of the electrode connecting portion including the electrode portion of the optical element and connecting with an external circuit, substantially does not project. Therefore, even if a local force, such as tensile force with respect to the connection terminal with the external circuit, is applied to the electrode portion, the applied force can be dispersed by virtue of the existence of the electrode connecting portions other than the electrode portion. This prevents an optical element defect due to seal peeling in the vicinity of the electrode portion.

Furthermore, when the optical element according to the second aspect is mounted as a component of a light source unit or display device, the present optical element may be bonded to each of the light beam direction regulating element and liquid crystal display device with a double-faced tape. In this case, by causing the electrode connecting portions including the electrode portion to have a structure existing over one entire side of the optical element, it is possible to gain adhesion areas with the light beam direction regulating element and liquid crystal display device. Hence, even if shocks or vibrations are applied to the light source unit or display device, there occurs no seal peeling, thereby enabling the defect prevention of the light source unit and display device.

In an optical element according to a third aspect of the present invention, the electrode connecting portion of the one of the substrates and the electrode connecting portion of the other of the substrates have regions that are opposed to each other. The regions that are opposed to each other are bonded together in at least one part.

The difference of the optical element according to the third aspect from that according to the first aspect lies in that the region where a connection terminal for external connection and the electrode portion on one electrode connecting portion are connected, and the region where the connection terminal for external connection and the electrode portion on the other electrode connecting portion are connected, exclusively, are not superimposed on each other. Hence, the area of one electrode connecting portion and the area of the other electrode connecting portion each of which is not connected to a respective one of the connection terminals, are opposed to each other. On those areas, there are provided bonding layers for bonding together the one and other electrode connecting portions. With such an arrangement, the present invention produces the effect of increasing the bonding strength of a side including the one and the other electrode connecting portions of the optical element. Furthermore, since the area of the one electrode connecting portion, to be connected to an external circuit, and area of the other electrode connecting portion, to be connected to the external circuit, are not opposed to each other, it is possible to enhance the yield of the optical element while ensuring its reliability, and further hold the optical element in a space-saving manner, as in the case of the optical element according to the first aspect.

In an optical element according to a fourth aspect of the present invention, the electrode portion of each of the electrode connecting portions is connected to the external circuit through an additional electrode portion, and a protective film is provided over the region in which the electrode portion of each of the electrode connecting portions and the additional electrode protion are not opposed to each other.

The optical element according to the fourth aspect can solve the problem that, even if the electrode portion on the one electrode connecting portion and that on the other electrode connecting portion are electrically connected to the connection terminal for external connection, the electrode portions and electrodes in the vicinity of seal will be exposed. Specifically, with the structure according to the fourth aspect, the present invention allows a protective film for short circuit prevention and/or corrosion protection to be formed over exposed portions of electrodes since they are not covered with both substrates unlike the conventional example, even if there are the exposed portions of electrodes left. Therefore, with the structure according to the fourth aspect, it is possible to reliably achieve short circuit prevention and corrosion protection.

In an optical element according to a fifth aspect of the present invention, on one or each of the pair of substrates, the optical element has an area without electrode in a part or over the entirety of the periphery thereof. The optical element has a layer that bonds together the pair of the substrates in a part or entirety of the area and that separates the optical element from the outside.

As in the optical element according to the fifth aspect, by providing an area without electrode on a part or over the entirety of the peripheral region of one or each of the substrates, the entire optical element portion according to the fifth aspect, bordering on the outside, becomes an insulating layer. This allows an increase in an adhesion force between sealing material for bonding together the upper and lower substrates, and the upper and lower substrates, leading to an improvement in yield of the optical element. Moreover, the electrodes are not located on the outermost periphery of the substrate, and hence, for example, even if conductive matter such as water drops adheres to the end portions of the upper and lower substrates, there is no possibility of causing a short circuit. This produces the effect of preventing an optical element defect.

A light source unit according to a sixth aspect of the present invention comprises a backlight that emits light, a light beam direction regulating element that regulates the direction of light entered from the backlight and that emits the light. The light source unit further comprises the optical element according to any one of the first to fifth aspect. The optical element is stacked on the light beam direction regulating element.

With such a stacked structure, the present invention allows the optical element to be held in a narrow space, while increasing its yield.

Furthermore, use of the optical element formed by enclosing a light adjusting material made by mixing a liquid crystal and polymer material into the gap between the two substrates, enables switching the optical element between a transparent state and scattering state by the switching between the state of applying a voltage to the optical element through the external circuit and the state of not doing so. This produces the effect of making variable the lighting angle range of the light source unit.

A display device according to a seventh aspect of the present invention comprises a backlight that emits light, a light beam direction regulating element that regulates the direction of light entered from the backlight and that emits the light. The display device further comprises the optical element according any one of the first to fifth aspects. The optical element is stacked on the light beam direction regulating element. The display device still further comprises a liquid crystal display element stacked on the optical element.

With such a feature, it is possible to held the optical element in a narrow space while improving its yield. Furthermore, since it is possible to switch the optical element between a transparent state and scattering state by the switching between the state of applying a voltage to the optical element through the external circuit and the state of not doing so, whereby the lighting angle range of the light source unit can be made variable. This allows a display device that can be switched between a wide view angle display and narrow view angle display to be provided.

A terminal device according to the present invention is characterized by being equipped with the above-described optical element, a light source unit using this optical element, or a display device using this light source unit. This makes it possible to held the optical element in a narrow space while enhancing yield thereof, as well as to make variable the lighting angle range of the light source unit. Furthermore, in the liquid crystal display element, its light source unit has a variable lighting angle range, the switching between a wide view angle display and narrow angle display can be achieved. Moreover, the terminal device equipped with this liquid crystal element device allows privacy protection, data conservation, and the sharing of display, since the selection between a wide view angle display and narrow view angle display can be made in accordance with a usage environment.

BRIEF DESCRIPTION OF THE DRAWINGS

FIG. 6A is a plan view of an optical element according to a second embodiment of the present invention.

FIGS. 6B and 6C are each a plan view showing the relationship among an upper electrode, lower electrode, and transparent electrode shown in FIG. 6A.

DESCRIPTION OF THE PREFERRED EMBODIMENTS

First Embodiment

Figure 4:
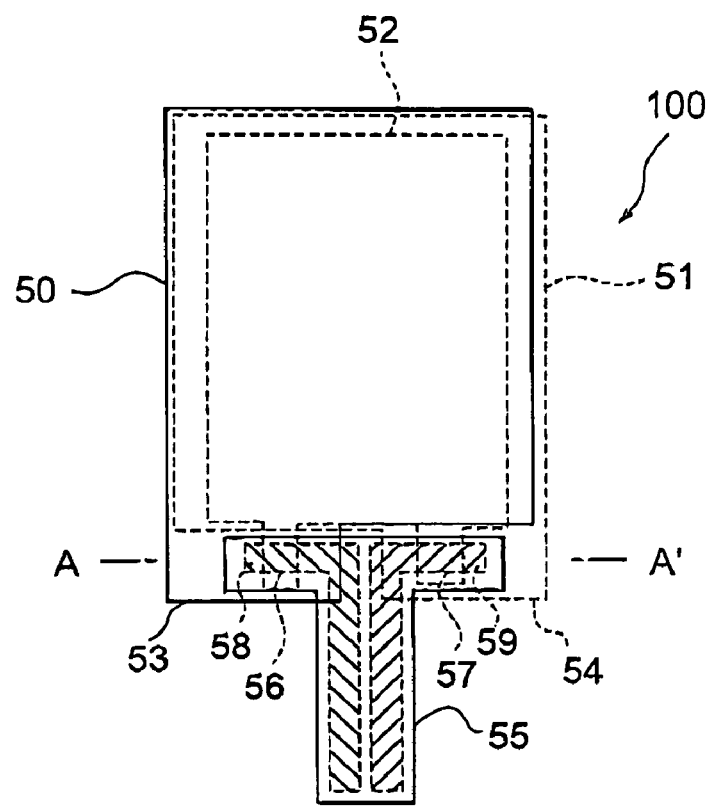
FIG. 4 is a plan view of an optical element according to a first embodiment of the present invention.
Figure 5:
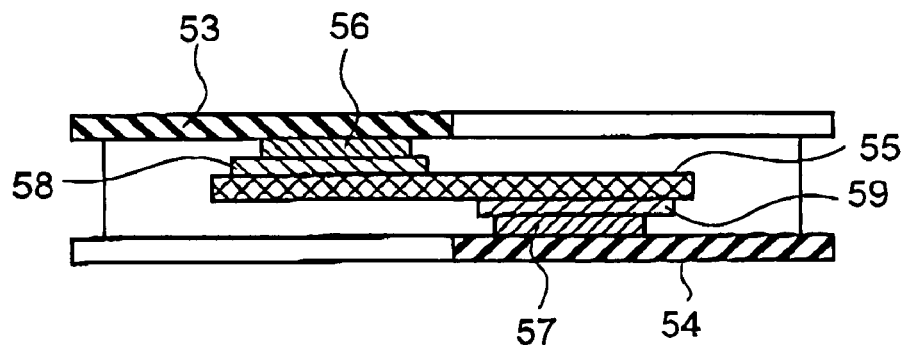
FIG. 5 is a sectional view taken along a line A-A' in FIG. 4.

First, an optical element according to a first embodiment of the present invention will be described with reference to FIG. 4. FIG. 4 is a plan view of the optical element according to the first embodiment, and FIG. 5 is a sectional view taken along a line A-A' in FIG. 4. Here, FIGS. 4 and 5 show a requisite minimum structure alone, for facilitating the understanding of the structure of this optical element according to this embodiment. The structure, therefore, is depicted as being somewhat different from the actual structure.

As shown in FIGS. 4 and 5, in the optical element 100 according to the first embodiment, an upper substrate 50 and lower substrate 51 are bonded together by a sealing material (not shown) with a gap therebetween, and a light adjusting material (not shown) made by mixing a liquid crystal and polymer is enclosed in the gap. In the first embodiment, although a mixture of a liquid crystal and polymer is used as the light adjusting material, the liquid crystal alone may be used as the light adjusting material.

On each of the upper substrate 50 and lower substrate 51, there is provided a transparent electrode 52 for driving the light adjusting material.

Electrode connecting portions 53 and 54 for establishing an electric connection with an external circuit are provided on the upper substrate 50 and lower substrate 51, respectively. The electrode connecting portions 53 and 54 are provided on the same side of the optical element 100, and they are configured so that they do not project substantially from the side of the optical element 100, and that they are not opposed to each other.

The transparent electrode 52 on each of the upper substrate 50 and lower substrate 51 is projected toward a part on a respective one of the electrode connecting portion 53 and electrode connecting portion 54 of each of the substrates, and these projected portions form respective electrode portions 56 and 57 for connecting with an electrode for an external circuit. The electrode portions 56 and 57, respectively, are electrically connected to electrode portions (additional electrode portions) 58 and 59 on the connection terminal 55 that is electrically connected to the external circuit. The connection terminal 55 is connected to the external circuit (not shown) so as to be able to apply a drive waveform signal to the optical element 100 through the electrode portions 58 and 59.

On each of the upper substrate 50 and lower substrate 51, a region without the transparent electrode 52 is formed around the outer peripheral portion including the outermost periphery. Furthermore, a sealing material (not shown) is applied to the region without the transparent electrode 52 on both substrates, except for the electrode portions 56 and 57, thereby bonding together the upper substrate 50 and lower substrate 51.

As described above, in the first embodiment, since the electrode connecting portion 53 on the upper substrate 50 and the electrode connecting portion 54 on the lower substrate 51 are not opposed to each other, the terminal can be connected without the need to open the terminal connecting portions. This allows the suppression of yield reduction of the optical element due to seal peeling when performing terminal connection.

Furthermore, since the terminal connection can be established without the need to open terminal connecting portions, it is possible to reduce a margin on the seal side of the opening portion for terminal connection, leading to the prevention of occurrence of a short circuit between electrodes or their corrosion due to water or the like. Also, since the terminal connection is feasible without the use of a pinching member and/or a jig for terminal insertion unlike the conventional art, work efficiency is improved.

Moreover, in the first embodiment, since the electrode connecting portions 53 and 54 are not opposed to each other, there is no need for the connection terminal to be pinched by the upper and lower substrates. This allows a gap defect of the display portion due to the thickness of the connection terminal 55 to be eliminated.

Furthermore, since the terminal connection can be established without the need to open terminal connecting portions, there is no need to provide a margin in the terminal connecting portions for the purpose of preventing seal peeling. This leads to the narrowing of the frame of the side of the optical element 100.

By providing an area without electrode on a part or over the entirety of the peripheral region on both of the upper substrate 50 and lower substrate 51, the entire optical element portion of the optical element 100, bordering on the outside, becomes an insulating layer. Moreover, the electrode are not located on the outermost periphery of the substrate, and hence, for example, even if conductive matter such as water drops adheres to the end portions of the upper and lower substrates, there is no possibility of causing a short circuit. This produces the effect of preventing an optical element defect.

Since the upper and lower substrates 50 and 51 are bonded together by interposing the seal member in an area without electrode around the upper and lower substrates, the adhesion force between the sealing material and the upper and lower substrates increases, resulting in an improved yield of the optical element.

Moreover, the electrode connecting portions 53 and 54 are configured to be formed on the same side of the optical element 100, and not to project from the side of the optical element. Therefore, even if a local force, such as tensile force with respect to the connection terminal with the external circuit, is applied to the electrode portion, the applied force can be dispersed by virtue of the existence of the electrode connecting portions 53 and 54 other than the electrode portion. This allows the prevention of a display defect due to seal peeling in the vicinity of the electrode portion.

As will be described in detail later with reference to FIGS. 9 and 10, when the optical element 86 is mounted as a component of a light source unit or display device, the optical element 86 is bonded to each of the light beam direction regulating element 72 and liquid crystal display device 85 with a double-faced tape, and fixed. In this case, the electrode connecting portions 53 and 54 including the electrode portions have been caused to have a structure existing over the one entire side of the optical element 100, it is possible to gain adhesion areas with the light beam direction regulating element 72 and liquid crystal display device 85. Hence, even if shocks or vibrations are applied to the light source unit or display device, there occurs no seal peeling, thereby enabling the defect prevention of the light source unit and display device.

Here, operations of the optical element 100 according to the first embodiment will be described.

The drive waveform signal sent from the external circuit is transmitted to the upper and lower transparent electrodes 52 through the electrode portions 58 and 59 on the connection terminal 55, and drives the light adjusting material.

Figure 11A:
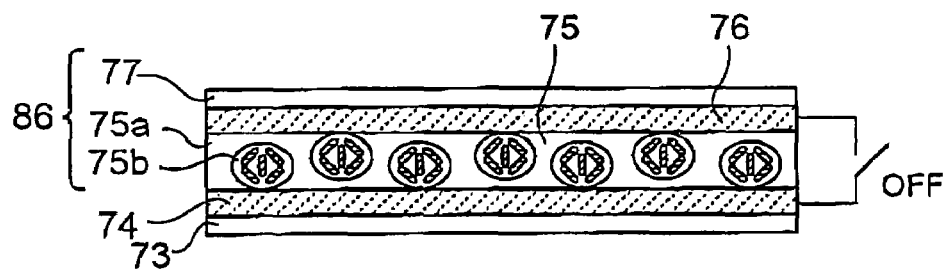
FIGS. 11A and 11B, respectively, are a sectional view showing a scattering state and transmission state of the optical element according to the present invention.
Figure 11B:
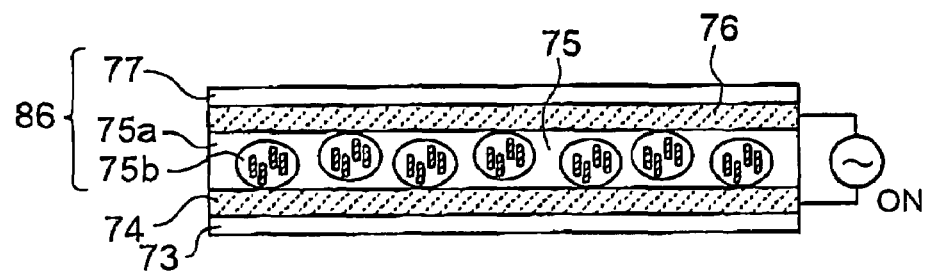

In the first embodiment, as shown in FIGS. 11A and 11B, a polymer dispersion liquid crystal layer 75 constituted of a mixture of a liquid crystal and polymer material is used as a light adjusting material. The polymer dispersion liquid crystal layer 75 is sandwiched between electrodes 74 and 76, and further sandwiched between substrates 73 and 77. The polymer dispersion liquid crystal layer 75 is configured so that liquid crystal molecules 75b are dispersed in a droplet form in a polymer film 75a. The refractive index of the polymer film 75a and the ordinary refractive index of the liquid crystal molecules 75b are approximately conformed to each other, and the extraordinary refractive index of the liquid crystal molecules 75b is higher than the refractive index of the polymer film 75a.

As shown in FIG. 11A, when no voltage is applied to the electrodes 74 and 76, droplet-shaped liquid crystal molecules 75b are oriented in random directions since they have been subjected to no orientation processing. As a result, the refractive index of the droplet becomes the average value between the ordinary refractive index of the liquid crystal molecules 75b and the extraordinary refractive index thereof, thus exceeding the refractive index of the polymer film 75a. The difference in refractive index between the droplet and polymer film 75a brings the polymer dispersion liquid crystal layer 75 into a scattering state. Because the difference in refractive index is not anisotropy, light is isotropically scattered.

On the other hand, as shown in FIG. 11B, upon application of a voltage to the electrodes 74 and 76, the liquid crystal molecules 75b in the droplets are oriented in the direction of an electric field. That is, the major axes (having a direction of extraordinary refractive index) of the liquid crystal molecules 75b are aligned with one another in the direction parallel to the element normal direction (in the upward direction in the drawing). In the element surface, therefore, the refractive index of the liquid crystal molecules 75b becomes the ordinary refractive index thereof, thus conforming to the refractive index of the polymer film 75a. This brings the polymer dispersion liquid crystal layer 75 into a transparent state.

As is evident from the foregoing, with the structure according to the first embodiment, the present invention allows the yield of the optical element to be enhanced while ensuring its reliability, and enables the optical element to be stored in a space-saving manner, as well as it is capable of driving the optical element.

Second Embodiment

Next, a second embodiment according to the present invention will be described.

Figure 7:
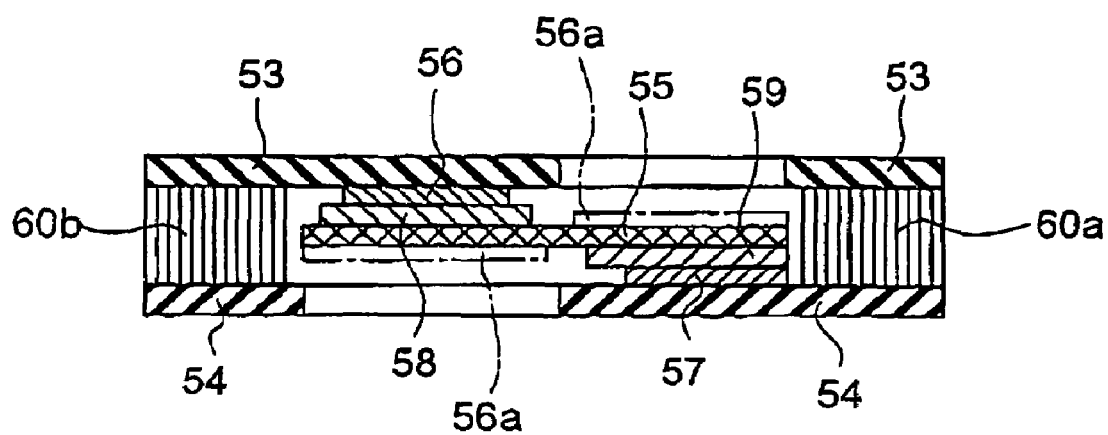
FIG. 7 is a sectional view taken along a line A-A' in FIG. 6A.

FIG. 6A is a plan view of an optical element according to the second embodiment, and FIGS. 6B and 6C are plan views each showing the relationship among an upper electrode, lower electrode, and transparent electrode in this optical element. FIG. 7 is a sectional view taken along a line A-A' in FIG. 6A. Here, FIGS. 6A to 6C show its requisite minimum construction alone, for facilitating the understanding of the structure of the optical element according to this embodiment. The structure, therefore, is depicted as being somewhat different from the actual structure.

The difference of the optical element according to the second embodiment from that of the first embodiment lies in that the regions where the electrode connecting portions 53 and 54 are not opposed to each other are set as follows. The region where the electrode portions 56 and 58 are connected out of the electrode connecting portion 53, and the region where the electrode portions 57 and 59 are connected out of the electrode connecting portion 54, are configured so as not to be opposed to each other. As a result, both side regions (refer to FIG. 6B) of the electrode connecting portion 53 and both side regions (refer to FIG. 6C) of the electrode connecting portion 54 are mutually opposed. These opposed portions are provided with bonding layers 60a and 60b for bonding the electrode connecting portions 53 and 54, respectively. With this feature, the present invention produces the effect of increasing the bonding strength of a side including the electrode connecting portions 53 and 54 of the optical element.

Since the area of the electrode connecting portion 53, to be connected to the external circuit and the area of the electrode connecting portion 54, to be connected to the external circuit are not opposed to each other, it is possible to improve the yield of the optical element while ensuring its reliability, and further held the optical element in a space-saving manner, as in the case of the optical element according to the first aspect.

Furthermore, constructions, operations, and effects other than the foregoing in the second embodiment are similar to those in the above-described first embodiment.

Third Embodiment

Now, an optical element according to a third embodiment of the present invention will be described.

The optical element according to the third embodiment is characterized in that: a pair of substrates each having an electrode is bonded together with a gap therebetween; a light adjusting material including at least a liquid crystal is enclosed in the gap; each of the pair of substrates has an electrode connecting portion to be connected to an external circuit; and a protective film is provided over at least a part of each of the regions that include the electrode portion of each of the electrode connecting portions. That is, the difference of the optical elements according to the third embodiment from those of the first and second embodiments lies in that a protective film 56a is formed over each of the portions in which the electrode portions 56, 57 and the electrode portions 58, 59 are not opposed to each other, respectively (FIG. 8 shows only a protective film over the portion in which the electrode portion 56 and the electrode portion 58 is not opposed to each other).

Figure 8:
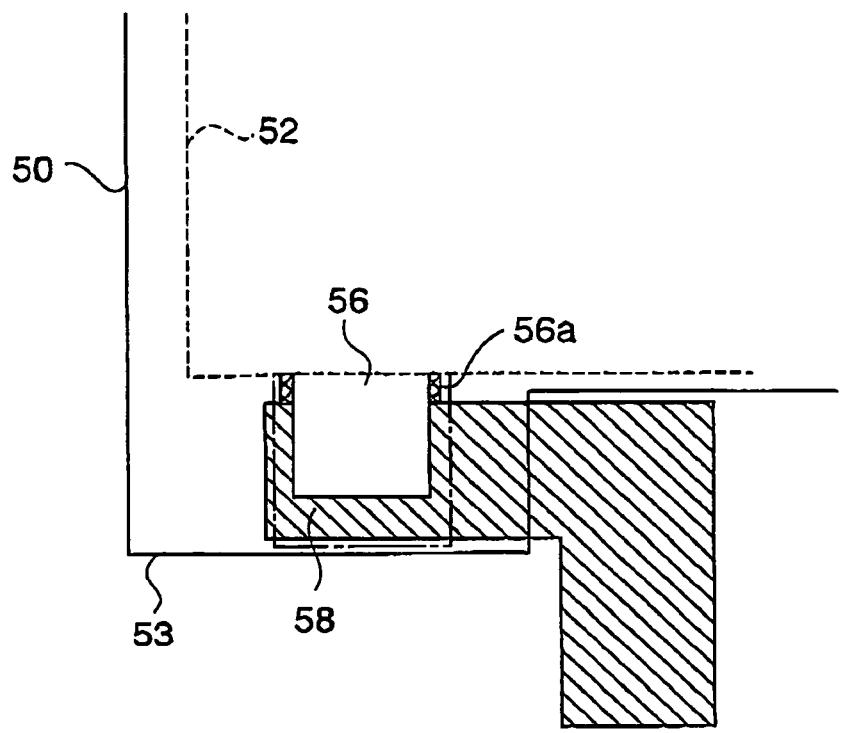
FIG. 8 is a plan view of an optical element according to a third embodiment of the present invention, wherein a portion corresponding to the vicinity of an electrode connecting portion of an upper electrode in FIG. 4 is especially shown in enlarged form.

FIG. 8 is a plan view of the neighborhood of the electrode connecting portion 53 on the upper substrate 50 in FIG. 4, this plan view being shown in an enlarged form for exhibiting the feature of the optical element according to the third embodiment. As is evident from FIG. 8, the electrode portion 56 projected from the transparent electrode 52 toward the electrode connecting portion 53, and the electrode portion 58 of the connection terminal 55 (not shown) are electrically connected to each other.

As shown in FIG. 8, even though the electrode portion 56 on the electrode connecting portion 53 is electrically connected to the electrode portion 58 of the connection terminal 55, there is a possibility that the electrode portion 56 in the vicinity of the sealed portion will be exposed. However, with a construction such as that of the third embodiment, even if there are the exposed portions of electrodes left, the present invention enables a protective film 56a for short circuit prevention and/or corrosion protection to be formed over the exposed portions of electrodes since they are not covered with the upper and lower substrates unlike the conventional example. Therefore, use of the structure according to the third embodiment makes it possible to reliably achieve short circuit prevention and corrosion protection. In addition, the protective film 56a may be provided so as to cover each of the whole regions of the electrode portions 56 and 57 as illustrated by a chain line in FIGS. 7 and 8.

Furthermore, constructions, operations, and effects other than the foregoing in the third embodiment are similar to those in the above-described first and second embodiments.

Fourth Embodiment

Next, a light source unit according to a fourth embodiment of the present invention will be described.

The light source unit according to the fourth embodiment of the present invention is characterized in that the above-described optical element is stacked on a backlight that emits light, and a light beam direction regulating element that regulates the direction of light incident from the backlight and that emits the light.

Figure 1A:
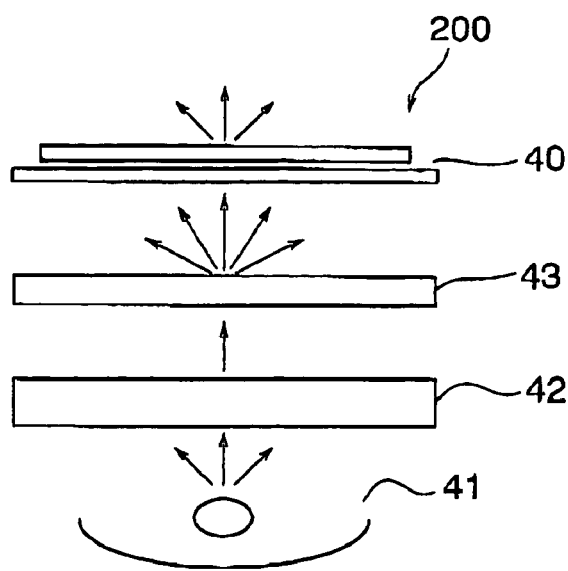
FIGS. 1A and 1B are schematic diagrams of a liquid crystal device according to a first conventional example.
Figure 1B:
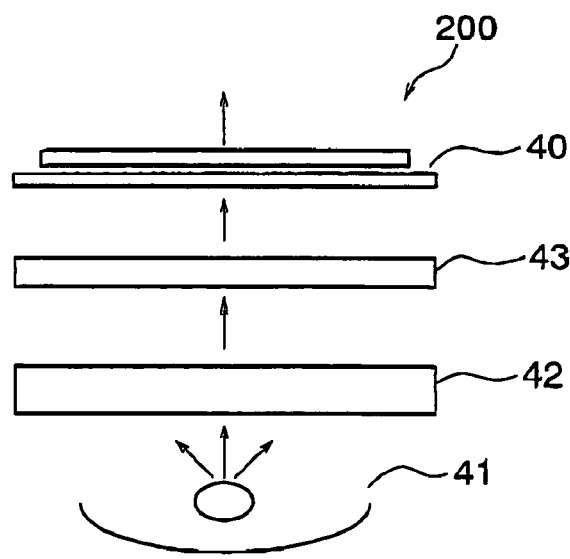
Figure 2:
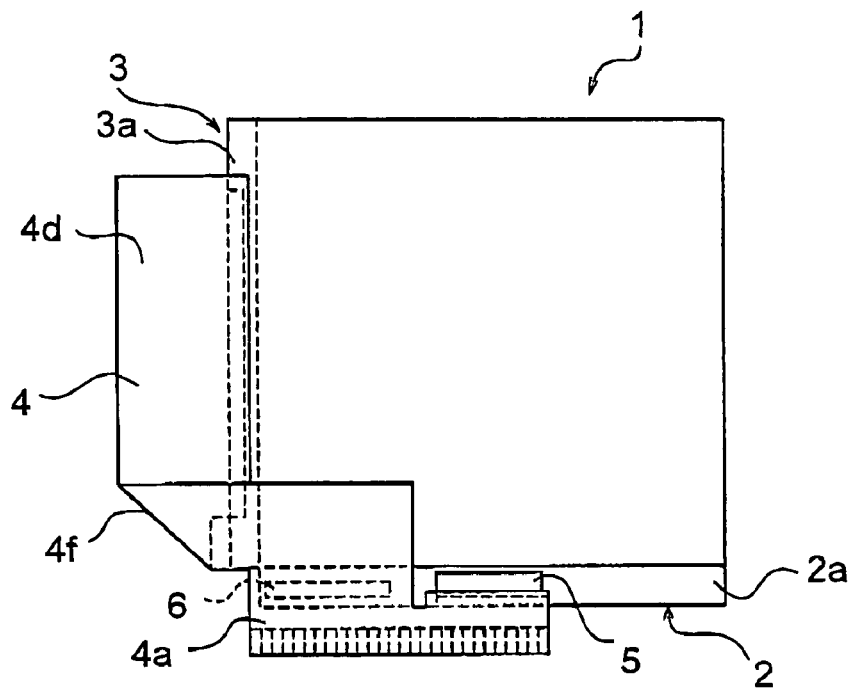
FIG. 2 is a schematic diagram of a liquid crystal device according to a second conventional example.
Figure 3:
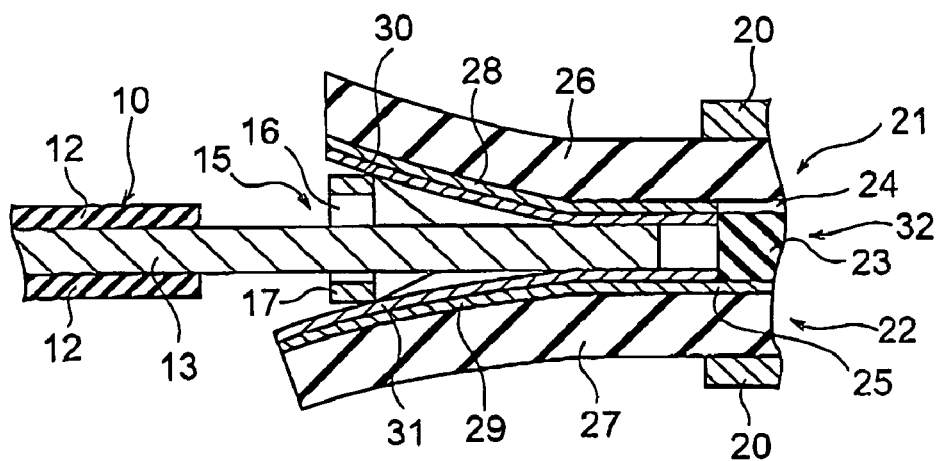
FIG. 3 is a schematic diagram of a liquid crystal device according to a third conventional example.
Figure 9:
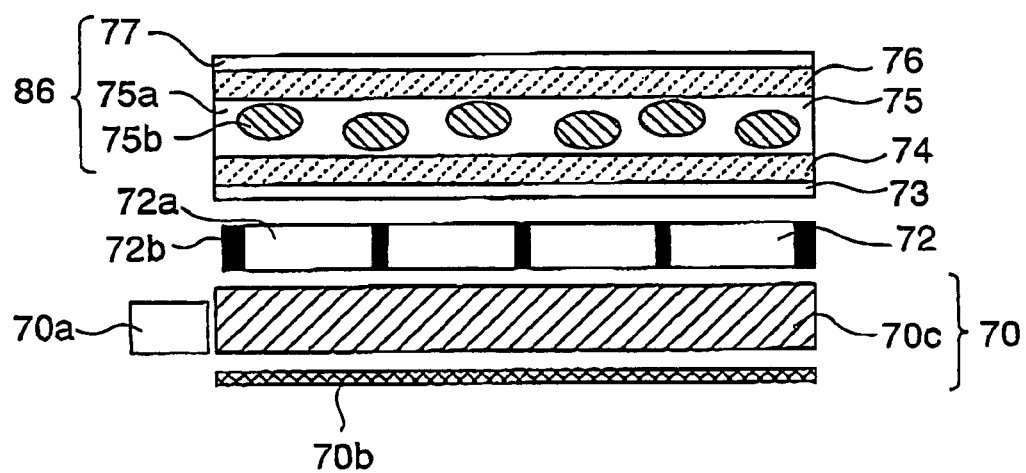
FIG. 9 is a sectional view of a light source unit according to a fourth embodiment of the present invention.

FIG. 9 is a sectional view of the light source unit according to the fourth embodiment of the present invention. Here, components are separately illustrated for easy understanding. As shown in FIG. 9, in the light source unit according to the fourth embodiment, the light beam direction regulating element 72 is provided on the backlight 70, and the above-described optical element 86 is provided on the light beam direction regulating element 72. As can be seen from this construction, the light source unit includes a light-emitting portion, light beam direction regulating element, and optical element, and is different from the light source 41 described with reference to FIGS. 1A and 1B. The light source 41 described with reference to FIGS. 1A and 1B corresponds to the backlight 70 out of the light source unit according to the present invention.

As shown in FIG. 9, a light source element 70a is provided on a side of the backlight 70, and causes light emitted from the light source element 70a incident on a light guide plate 70c.

The light guide plate 70c refracts and makes reflect the incident light to change the incident angle by a plurality of prisms (not shown) provided in a plane of the light guide plate 70c and a light reflector 70b provided on the back thereof, and emits light from the entire surface of the light guide plate 70c. The outgoing light has an angular distribution spread at a wide angle about the normal direction to an element surface (i.e., upward direction in the drawing, in FIG. 9).

Here, in order to enhance the usage efficiency of the backlight beams, it is desired to narrow the spread of the backlight beams to a minimum.

As shown in FIG. 9, the light beam direction regulating element 72 is configured, for example, so that the transparent region 72a that passes light through and an absorption region 72b that absorbs light are alternately arranged in a direction parallel to the surface of the light beam direction regulating element 72 (i.e., in the right-left direction of the drawing). Out of light outgoing from the backlight, narrow angle light from the front direction passes through the transparent region 72a and is emitted. However, wide angle light cannot pass through the transparent region 72a, but is absorbed in the absorption region 72b. This restricts the spread of light of the outgoing light from the backlight 70.

As shown in FIG. 9, the optical element 86 has a structure, for example, wherein the polymer dispersion liquid crystal layer 75 is sandwiched between electrodes 74 and 76, and further sandwiched between substrates 73 and 77. The polymer dispersion liquid crystal layer 75 is configured so that the liquid crystal molecules 75b are dispersed in a droplet form in the polymer film 75a. The refractive index of the polymer film 75a and the ordinary refractive index of the liquid crystal molecules 75b are approximately conformed to each other, and the extraordinary refractive index of the liquid crystal molecules 75b is higher than the refractive index of the polymer film 75a.

As described with reference to FIG. 11A, when no voltage is applied, droplet-shaped liquid crystal molecules 75b are oriented in random directions since they have been subjected to no orientation processing. As a result, the refractive index of the droplet becomes the average value between the ordinary refractive index of the liquid crystal molecules 75b and the extraordinary refractive index thereof, thus exceeding the refractive index of the polymer film 75a. The difference in refractive index between the droplet and polymer film 75a brings the polymer dispersion liquid crystal layer 75 into a scattering state. Therefore, when passing through the optical element 86, light entered into the light beam direction regulating element 72 is scattered, so that the outgoing light spreads. Furthermore, this light isotropically scattered because the difference in refractive index is not anisotropy. Hence, the spread of the outgoing light also becomes isotropic.

On the other hand, as described with reference to FIG. 11B, upon application of a voltage to the electrodes 74 and 76, the liquid crystal molecules 75b in the droplets are oriented in the direction of an electric field. That is, the major axes (having a direction of extraordinary refractive index) of the liquid crystal molecules 75b are aligned with one another in the direction parallel to the element normal direction (in the upward direction in the drawing). In the element surface, therefore, the refractive index of the liquid crystal molecules 75b becomes the ordinary refractive index thereof, thus conforming to that of the polymer film 75a. This brings the polymer dispersion liquid crystal layer 75 into a transparent state. Consequently, the outgoing light from the light beam direction regulating element 72 is not scattered when passing through the optical element 86, so that the spread of light is limited.

As in the fourth embodiment, use of an optical element formed by enclosing a light adjusting material made by mixing a liquid crystal and polymer material between a pair of substrates allows switching the optical element between a transparent state and scattering state by the switching between the state of applying a voltage to the optical element through the external circuit and the state of not doing so. This produces the effect of making variable the lighting angle range of the light source unit.

Furthermore, constructions, operations, and effects other than the foregoing in the fourth embodiment are similar to those in the above-described first to third embodiments.

Fifth Embodiment

Now, a display device according to a fifth embodiment of the present invention will be described.

The display device according to the fifth embodiment of the present invention is characterized in that the above-described optical element is stacked on a backlight emitting light, and a light beam direction regulating element which regulates the direction of light entered from the backlight and which emits the light, and that a liquid crystal display device is further stacked on the optical element. That is, the difference of the display device according to the fifth embodiment from that of the fourth embodiment lies in that the liquid crystal display device is stacked on the optical element.

Figure 10:
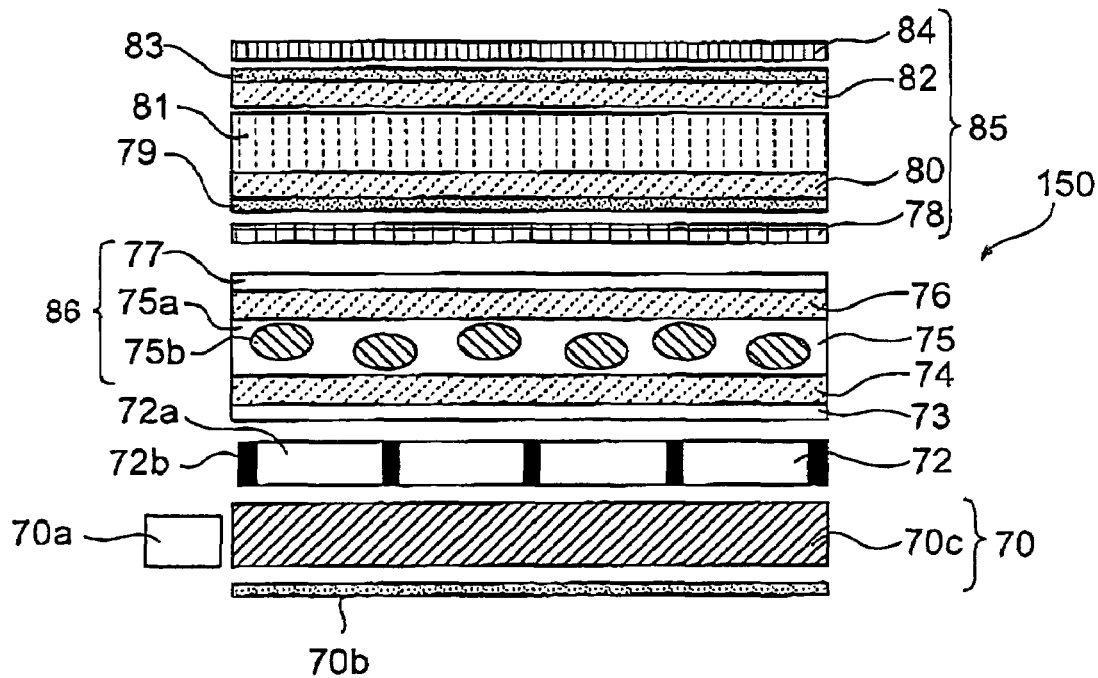
FIG. 10 is a sectional view of a display device according to a fifth embodiment of the present invention.

As shown in FIG. 10, the display device 150 is configured so that the optical element 86 is stacked on the backlight 70 with the light beam direction regulating element 72 therebetween, and that a liquid crystal display element 85 formed by sandwiching liquid crystal layer 81 between substrates 79 and 83 is stacked on the optical element 86. In FIG. 10 also, components are separately illustrated for easy understanding. On the substrates 79 and 83, oriented films (not shown) for determining the oriented direction of liquid crystal, and electrodes 80 and 83 for the purpose of independently driving pixels are formed on the sides of liquid crystal layer 81. Furthermore, absorptive polarizers 78 and 84, respectively, are bonded to the surfaces of the substrates 79 and 83 (surfaces remote from the liquid crystal layer 81). Here, it is preferable that the surfaces of the absorptive polarizers 78 and 84, especially the surface of the absorptive polarizer 84 be not subjected to antiglare treating, which aims an antiglare effect by scattering.

In FIG. 10, as the liquid crystal display element 85, a minimum construction alone is shown for facilitating understanding of effects of the fifth embodiment. The actual liquid crystal display element, therefore, includes constituent elements other than those shown in FIG. 10. Examples of constituent elements not shown in FIG. 10 include a thin-film transistor (TFT), color filter, black matrix, etc.

The liquid crystal display element 85 is changed in the orientation of liquid crystal molecules by applying a voltage to the liquid crystal layer 81. Polarized light that has passed through the absorptive polarizer 78 is changed in a polarization state by a birefringence effect or optical activity due to an orientation change of liquid crystal molecules, and the amount of light passing through the absorptive polarizer 84 changes. Here, the amount of outgoing light is adjusted on a pixel-by-pixel basis, and thereby a contrast adjustment of display is implemented.

The view angle characteristic of the liquid crystal display element 85 depends on a liquid crystal display mode. In order to realize a wide view angle state and narrow view angle state as in the present invention, it is preferable to adopt a wide view angle mode as a liquid crystal display mode. Specifically, wide view angle modes include lateral electric field mode such as an in-plane switching (IPS) mode and fringe field switching (FES) mode for operating liquid crystal molecules in a plane of the liquid crystal display element 85 utilizing a lateral electric field; and a film compensation modes such as a vertical alignment (VA) mode, patterned vertical alignment (PVA) mode, and advanced super V (ASV) mode for performing optical compensation using a vertical orientation mode or anisotropic optical film.

Thereby, the view angle of the liquid crystal display element 85 can be switched between a narrow view angle state and wide view angle state by switching the optical element between a transparent state and scattering state using the liquid crystal display element 85 capable of a wide view angle display.

Next, description will be made of operations of the display device according to the fifth embodiment, formed as described above. As shown in FIG. 10, the light outgoing from the backlight 70 is diffused light and has a wide angular distribution from the front of the display device. The light outgoing from the backlight 70 is limited in the angular range of outgoing light by the light beam direction regulating element 72. Specifically, as shown in FIG. 10, wide angle light out of the diffused light cannot pass through the transmission region 72a, but is absorbed in the absorption region 72b. The light outgoing from the light beam regulating element 72 results in an outgoing light with high directivity.

Upon entering of this outgoing light into the optical element 86, the incident light is isotropically scattered, since there is no voltage applied to the optical element 86 as described with reference to FIG. 11A. Therefore, the light outgoing from the optical element 86 reduces in directivity, and has an isotropically wide angular distribution.

As shown in FIG. 10, the outgoing light having isotropically spread in a wide range enters the liquid crystal display element 85, and is emitted with the angular distribution unchanged. Because the liquid crystal display element 85 uses a liquid crystal in a wide view angle mode, images are displayed at a wide view angle.

Next, the case of a narrow view angle is described. As in the case of the wide view angle, light outgoing from the backlight 70 passes through the light beam regulating element 72, and the outgoing light with high directivity enters the optical element 86.

As described with reference to FIG. 11B, the optical element 86 comes into a transparent state by applying a voltage to the optical element 86 serving as a transparence/scattering switching element, and by orienting the liquid crystal molecules 75b. In this case, incident light is emitted without being scattered. In other words, the directivity of the light outgoing from the optical element 86 still remains high. This outgoing light with high directivity enters the optical element 85, and is emitted with the angular distribution unchanged. Thus, an image at a narrow view angle is displayed.

As described above, with the arrangement according to the fifth embodiment, the present invention allows the optical element to be held in a narrow space while improving the yield of the optical element. In addition, the optical element 86 can be switched between a transparent state and scattering state by the switching between the state of applying a voltage to the optical element 86 and the state of not doing so, whereby the liquid crystal display device 85 is made variable in the lighting angle range of the light source unit. This allows the switching between a wide view angle display and narrow view angle display.

According to the present invention, there is further provided a terminal device incorporating the above-described optical element, a light source unit using this optical element, or a display device using this light source unit, especially a hand held or portable terminal.

Figure 12:
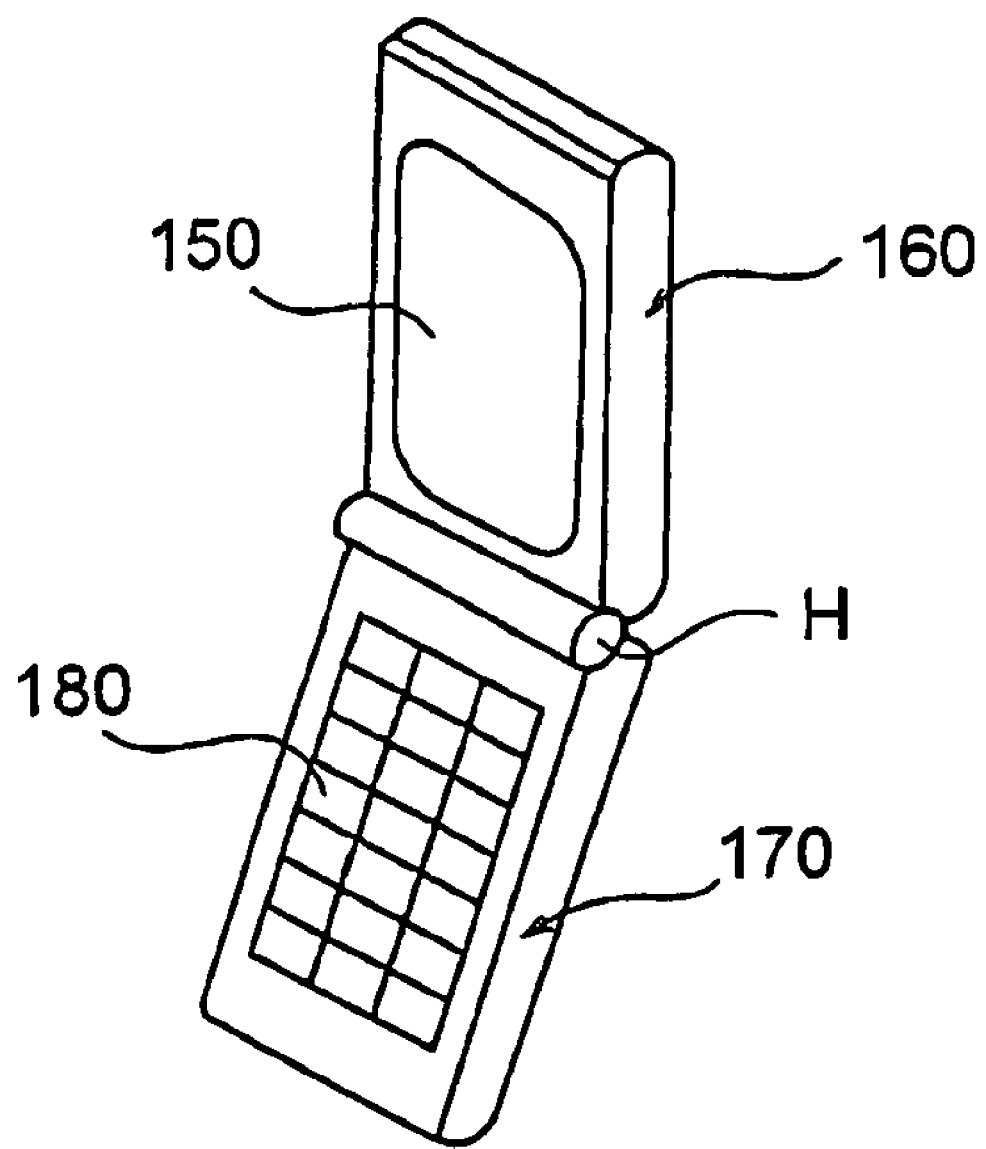
FIG. 12 is an example in which the present invention is incorporated especially into a mobile phone out of terminal devices.

FIG. 12 is an example in which the present invention is incorporated especially into a mobile phone out of terminal devices. As shown in FIG. 12, the mobile phone is configured so that a reception unit 160 and transmission unit 170 are connected at a hinge portion H. The reception unit 160 has a display device 150, and the transmission unit 170 has a plurality of key switches 180.

Having described the present invention as related to several embodiments, it is to be understood that the optical element, light source unit, display device, and terminal device according to the present invention are not limited to the above-described embodiments, but various changes and modifications may be made in their constructions. Also it is to be understood that the optical elements, light source units, display devices, and terminal devices having subjected to such changes and modifications are also included in the range of the present invention.

For example, as a substrate used for the optical element 86, not only a transparent substrate, but also a substrate of which the electrode connection portion is opaque, and a substrate of which the display portion is partially opaque may be adopted.

Also, an optical element that is transparent when no voltage is applied thereto, and that is in a scattering state when a voltage is applied, may be used as the optical element 86. Thereby, the lighting angle range of the light source unit or the view angle range of the display device can be made variable by the switching between the state of applying a voltage to the optical element and the state of not doing so, as in the above-described embodiments.

Moreover, as the optical element 86, a polymer dispersive liquid crystal layer having memory capability may be used instead of the polymer dispersive liquid crystal layer 75. In this case, the liquid crystal polymer molecules 75b may include a ferroelectric liquid crystal and cholesteric liquid crystal. Even when an applied voltage is turned off, these liquid crystals retains their orientation generated when a voltage was applied, thereby presenting a memory capability. This brings the effect of reducing power consumption.

According to the present invention, there is provided an optical element in which a pair of substrates each having an electrode is bonded together with a gap therebetween, and in which a light adjusting material including at least a liquid crystal is enclosed in the gap, each of the pair of substrates having an electrode connecting portion to be connected to an external circuit. In particular, the electrode connecting portions of both substrates are located on the same side as that of the optical element; the electrode connecting portion of one of the substrates and the electrode connecting portion of the other of the substrates have respective electrode portions at regions that are not opposed to each other; and the electrode portion of each of the electrode connecting portions is connected to the external circuit. This makes it possible to improve the yield of the optical element while ensuring its reliability, and store the optical element in a space-saving manner, as well as drive the optical element.

What is claimed is:

1. An optical element, comprising:
a pair of substrates each having an electrode, the pair of substrates being bonded together with a gap formed therebetween, each of the pair of substrates having an electrode connecting portion for connecting the respective substrate to an external circuit, the electrode connecting portion of each of the substrates being located on the same side of the optical element, the electrode connecting portion of one of the substrates and the electrode connecting portion of another of the substrates having respective electrode portions disposed on the side of each of the substrates facing the gap and on regions that are not opposed to each other the electrode portion of each of the electrode connecting portions being connected to the external circuit; and
a light adjusting material including a liquid crystal, the light adjusting material being enclosed in the gap.

2. The optical element according to claim 1, wherein the electrode portion is not projected from the side of the optical element.

3. The optical element according to claim 1, wherein the electrode connecting portion of the one of the substrates and the electrode connecting portion of the other of the substrates have regions that are opposed to each other; and wherein the regions that are opposed to each other are bonded together in at least one part.

4. The optical element according to claim 1, wherein the electrode portion of each of the electrode connecting portions is connected to the external circuit through an additional electrode portion, and a protective film is provided over the region in which the electrode portion of each of the electrode connecting portions and the additional electrode portion are not opposed to each other.

5. The optical element according to claim 1, wherein, on one or each of the pair of substrates, the optical element has an area without electrode in a part or over the entirety of the periphery thereof; and wherein the optical element has a layer that bonds together the pair of the substrates in a part or entirety of the area and that separates the optical element from the outside.

6. A light source unit comprising:
a backlight that emits light;
a light beam direction regulating element that regulates the direction of light entered from the backlight and that emits the light; and
an optical element, comprising:
a pair of substrates each having an electrode, the pair of substrates being bonded together with a gap formed therebetween, each of the pair of substrates having an electrode connecting portion for connecting the respective substrate to an external circuit, the electrode connecting portion of each of the substrates being located on a same side of the optical element, the electrode connecting portion of one of the substrates and the electrode connecting portion of another of the substrates having respective electrode portions disposed on the side of each the substrates facing the gap and on regions that are not opposed to each other, the electrode portion of each of the electrode connecting portions being connected to the external circuit; and
a light adjusting material including a liquid crystal, the light adjusting material being enclosed in the gap.

7. A display device comprising:
a backlight that emits light;
a light beam direction regulating element that regulates the direction of light entered from the backlight and that emits the light;
an optical element, comprising:
a pair of substrates each having an electrode, the pair of substrates being bonded together with a gap formed therebetween, each of the pair of substrates having an electrode connecting portion for connecting the respective substrate to an external circuit, the electrode connecting portion of each of the substrates being located on a same side of the optical element, the electrode connecting portion of one of the substrates and the electrode connecting portion of another of the substrates having respective electrode portions disposed on the side of each the substrates facing the gap and on regions that are not opposed to each other, the electrode portion of each of the electrode connecting portions being connected to the external circuit; and a light adjusting material including a liquid crystal, the light adjusting material being enclosed in the gap; and a liquid crystal display element stacked on the optical element.

8. The optical element as recited in claim 1, wherein the optical element is incorporated in a terminal device.

9. The light source unit as recited in claim 6, wherein the light source unit is incorporated in a terminal device.

10. The display device as recited in claim 7, wherein the display device is incorporated in a terminal device.

* * * * *

UNITED STATES PATENT AND TRADEMARK OFFICE
CERTIFICATE OF CORRECTION

PATENT NO.         : 7,551,244 B2                                       Page 1 of 1
APPLICATION NO. : 11/510001
DATED              : June 23, 2009
INVENTOR(S)        : Kouji Mimura et al.

It is certified that error appears in the above-identified patent and that said Letters Patent is hereby corrected as shown below:

Title Page, Item (73) Assignee: should read

-- (73) Assignees: NEC Corporation
                   Tokyo, Japan

NEC LCD Technologies, Ltd.
                   Kanagawa, Japan

SEIKO ELECTRIC, LTD.
                   Fukuoka, Japan --

Signed and Sealed this

Thirtieth Day of March, 2010

David J. Kappos
*Director of the United States Patent and Trademark Office*